Nov. 12, 1940.  C. H. GLYNN, JR  2,221,705
FLUID DRIVE FOR VEHICLE WHEELS
Filed Sept. 16, 1939  2 Sheets-Sheet 1
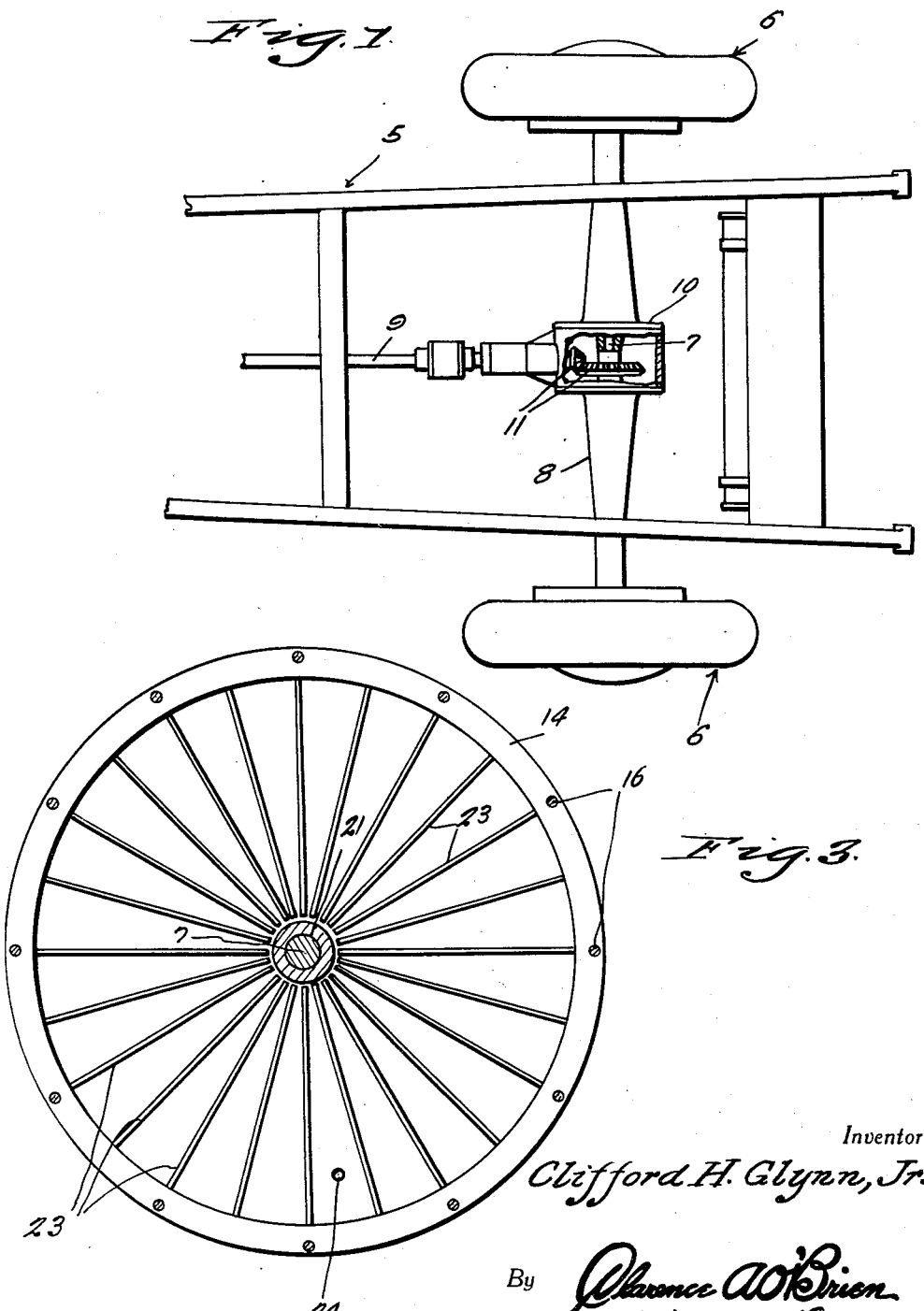
Inventor
Clifford H. Glynn, Jr.
By Clarence A. O'Brien
and Hyman Berman
Attorneys

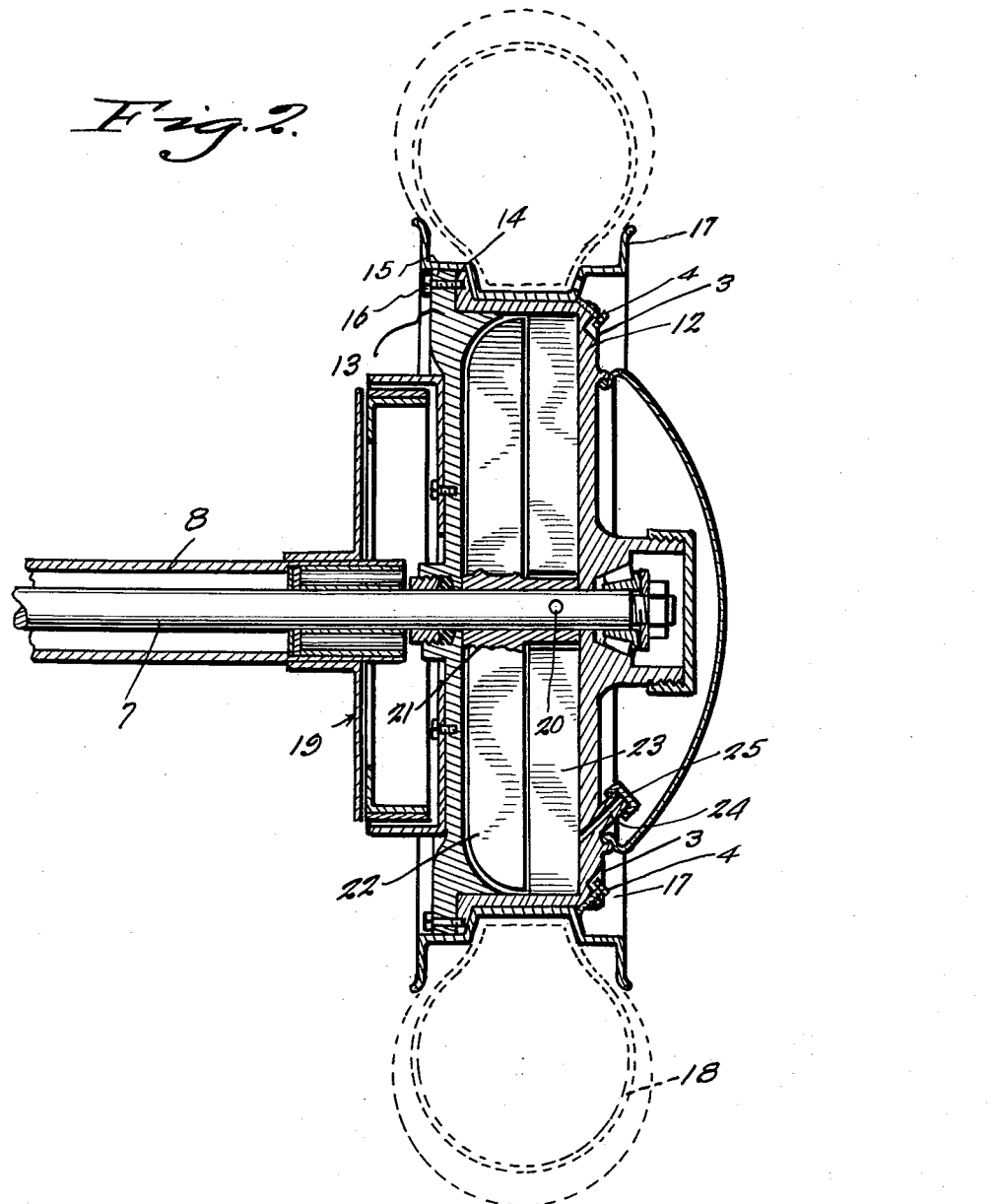

Patented Nov. 12, 1940

2,221,705

UNITED STATES PATENT OFFICE 2,221,705

FLUID DRIVE FOR VEHICLE WHEELS

Clifford Hallett Glynn, Jr., Albany, N. Y.

Application September 16, 1939, Serial No. 295,264

2 Claims. (Cl. 180—70)

This invention relates broadly to means for driving the wheels of a vehicle, particularly having reference to a power transmission of the fluid type for transmitting drive from the axle of the vehicle to a wheel mounted thereon.

The invention, together with its objects and advantages will be best understood from a study of the following description taken in connection with the accompanying drawings:

Figure 1 is a fragmentary top plan view showing the chassis frame and rear drive wheels of a vehicle and with parts broken away to illustrate the manner of connecting the propeller shaft of the vehicle with the rear axle thereof.

Fig. 2 is an enlarged sectional view through a drive wheel and associated parts and illustrating the invention.

Fig. 3 is a sectional view showing the blade equipped body section of the wheel.

Referring more in detail to the drawings, it will be seen that 5 indicates generally the rear portion of a conventional motor vehicle chassis frame; 6 the rear drive wheels for the vehicle, 7 an axle on the ends of which the wheels 6 are mounted; 8 a housing for the axle; and 9 the propeller shaft of the vehicle.

In accordance with the present invention, the axle housing 8 is provided with a gear casing 10 which accommodates a beveled gear assembly 11 connected with the propeller shaft 9 and the axle 7 for transmitting drive from the propeller shaft 9 to the axle 7.

A salient feature of the present invention is the means for transmitting drive from the axle 7 to each of the vehicle wheels 6.

In this connection, and in accordance with the present invention, each wheel 6 comprises a two-part body composed of complemental sections 12 and 13 that fit together as shown in Fig. 2 in a manner to provide a housing adapted to contain oil or other suitable fluid.

The sections 12 and 13 are complementarily flanged as at 14 and 15 and these flanges are apertured to accommodate screws 16 through the medium of which the sections 12 and 13 are secured in assembled condition.

The section 12 at its periphery is also constructed to accommodate a rim 17 for a pneumatic tire 18.

Rim 17 is secured on the periphery of section 12 of the wheel body through the medium of the flange 14 of said section and screws 4 that are threadedly engaged with the section 12 at the side thereof opposite to the flange 14 and bear against the rim 17 in a manner clearly shown in Fig. 2. To accommodate the heads of the screws 4 the body section 12 is provided with a series of relatively spaced notches or recesses 3 as shown. The screws 4 being at the outboard side of the wheel are readily accessible as is apparent.

The wheel brake which may be of any conventional construction is indicated generally by the reference numeral 19 and forms no part of the present invention.

A hub cap is also provided for the wheel and may be secured thereon in any suitable manner.

Further, in accordance with the present invention, the sections 12 and 13 of the wheel are equipped so as to accommodate one end of the axle 7, and secured on the axle 7 through the medium of a pin or other suitable key 20, and located within the hollow of the wheel formed by the sections 12 and 13 is a hub 21.

Hub 21 has radiating therefrom a plurality of vanes or blades 22 that complement a circular series of vanes or blades 23 suitably mounted within the section 12 of the wheel circumjacent the hub 21.

As previously described, the hollow body portion of the wheel formed by the sections 12 and 13 is adapted to contain suitable fluid, and the section 12 is equipped with a filling and discharge neck 24 for which a cap 25 is provided.

In connection with the mounting of the blades 23 it may be noted that these blades respectively may be welded at one longitudinal edge thereof to the end wall of the section 12 and at the outer end thereof to the peripheral wall of said section; or the blades, in any manner which will clearly present itself to the user, may be mounted by bolting or otherwise securing the same in place within the confines of the section 12 of the wheel body.

It will also be appreciated that sections 12 and 13 have a telescopic fit and provide a fluid tight chamber accommodating the vanes 22 and 23 and the fluid.

From the above, it will be apparent that drive is transmitted from the internal combustion engine or other prime mover of the vehicle to the propeller shaft 9 in the conventional manner, and from the propeller shaft 9 through the gearing 11 to the axle 7. Rotation being thus imparted to the axle 7, the blades 22, rotating with the axle, act to throw the liquid centrifugally outwardly in such a manner that the body of liquid forms an interlock or connection between the blades 22 rotating with the axle 7 and the blades 23 stationary with respect to the wheel body section 12, in such a manner that the wheel is forced to rotate with the axle 7.

From the above it will be apparent that with my invention employed in the manner herein suggested the need of a differential will be eliminated. This elimination of the differential will give added space inside the body of the vehicle. Also with the elimination of the differential both of the tractor or vehicle drive wheels will have traction power because each wheel has a separate transmission connection between itself and the axle.

It is thought that a clear understanding of the construction, operation, utility and advantages of a drive connection between an axle and a wheel, or between any analogous driving and driven members, will be had without a more detailed description thereof.

Having thus described the invention, what is claimed as new is:

1. In a motor vehicle including its chassis and a rear axle housing, a shaft journaled in the housing and having its ends projecting therefrom, a motor driven shaft geared to an intermediate part of the first-mentioned shaft, a pair of rear wheels rotatably arranged on the ends of the first-mentioned shaft and each including a chamber through the center of which the shaft passes, radiating blades connected at the inner ends with the shaft and occupying approximately half of the chamber and blades connected with parts of the walls of the chamber and occupying approximately the other half of the chamber and means for introducing liquid into each chamber.

2. In a motor vehicle including a driven shaft and a wheel driven by the shaft, said wheel including a pair of disk-like members, the inner one having an axially extending flange spaced from its outer circumference to leave a radially extending flange, the other disk-like member having a flange arranged at right angles thereto and of considerable width and overlapping the axially extending flange of the first member, and said flange of the said other disk-like member having a right angular extension at its free edge which contacts the inner face of the radially extending flange of the first member, means for detachably connecting said radial flange to the extension of the flange of the other disk-like member, the axially extending flanges of the two members forming a chamber between the two members, said members having centrally arranged openings therein for the passage of the shaft, radiating vanes connected at their inner ends with a part of the shaft in the chamber, complementary vanes connected with parts of the chamber wall and means for introducing liquid into the chamber.

CLIFFORD H. GLYNN, Jr.